(12) United States Patent
Kuznetsov (10) Patent No.: US 9,306,386 B2
(45) Date of Patent: Apr. 5, 2016

(54) ELECTROMAGNETIC DC PULSE POWER SYSTEM INCLUDING INTEGRATED FAULT LIMITER

(71) Applicant: Raytheon Company, Waltham, MA (US)

(72) Inventor: Stephen B. Kuznetsov, Marlborough, MA (US)

(73) Assignee: RAYTHEON COMPANY, Waltham, MA (US)

( * ) Notice: Subject to any disclaimer, the term of this patent is extended or adjusted under 35 U.S.C. 154(b) by 385 days.

(21) Appl. No.: 14/026,138

(22) Filed: Sep. 13, 2013

(65) Prior Publication Data

US 2015/0077893 A1    Mar. 19, 2015

(51) Int. Cl.
| | |
|---|---|
| H02H 9/02 | (2006.01) |
| H03K 3/37 | (2006.01) |
| H02M 1/32 | (2007.01) |

(52) U.S. Cl.
CPC .. *H02H 9/02* (2013.01); *H02M 1/32* (2013.01)

(58) Field of Classification Search
USPC ........................................... 361/93.9
See application file for complete search history.

(56) References Cited

U.S. PATENT DOCUMENTS

| | | | | | |
|---|---|---|---|---|---|
| 2,579,542 | A * | 12/1951 | Bostick | ................ | H01F 19/08 |
| | | | | | 327/181 |
| 2,710,351 | A * | 6/1955 | Lebacqz | ................ | H03K 3/55 |
| | | | | | 307/106 |
| 3,328,703 | A * | 6/1967 | Lee | ................ | H03K 3/55 |
| | | | | | 327/177 |
| 3,331,120 | A * | 7/1967 | Frost | ................ | B23K 20/001 |
| | | | | | 219/67 |
| 3,617,854 | A * | 11/1971 | Cole | ................ | H02M 7/10 |
| | | | | | 336/229 |
| 3,663,940 | A * | 5/1972 | Schwarz | ................ | H02M 3/315 |
| | | | | | 363/28 |
| 3,737,679 | A * | 6/1973 | Cooper | ................ | H03K 3/57 |
| | | | | | 327/181 |
| 3,772,601 | A * | 11/1973 | Smith | ................ | H03K 3/55 |
| | | | | | 307/106 |
| 4,099,066 | A | 7/1978 | Beggs | | |
| 4,255,668 | A * | 3/1981 | Harrison | ................ | H05G 1/22 |
| | | | | | 307/107 |
| 4,274,134 | A * | 6/1981 | Johannessen | ................ | H03K 3/57 |
| | | | | | 307/106 |
| 4,348,598 | A * | 9/1982 | Smith | ................ | H03K 17/601 |
| | | | | | 323/290 |

(Continued)

FOREIGN PATENT DOCUMENTS

EP      2523327 A1    11/2012

OTHER PUBLICATIONS

International Search Report and Written Opinion; International Application No. PCT/US2014/055165; International Filing Date: Sep. 11, 2014; Date of Mailing: Feb. 26, 2015; 10 pages.

(Continued)

*Primary Examiner* — Thienvu Tran
*Assistant Examiner* — Angela Brooks
(74) *Attorney, Agent, or Firm* — Cantor Colburn LLP (57) ABSTRACT

An electromagnetic direct current (DC) power system includes a plurality of pulse forming networks (PFN) modules. Each pulse forming network (PFN) module includes a PFN circuit, a fault current limiting (FCL) circuit and a cooling system. The pulse PFN circuit is configured to generate a pulsed DC output power. The PFN circuit further includes at least one energy storage inductor with primary winding having a primary winding inductance that controls a primary impedance of the PFN circuit. The FCL circuit includes a secondary winding that electrically communicates with the primary winding. The FCL circuit is configured to receive fault energy existing in the PFN circuit during a fault event. The cooling system is configured to cool at least one of the primary winding and the secondary winding, and remove a portion of the fault energy.

20 Claims, 10 Drawing Sheets

(56) References Cited

U.S. PATENT DOCUMENTS

| | | | | |
|---|---|---|---|---|
| 4,614,878 | A | * | 9/1986 | Lauchner ............ H03K 17/122 307/106 |
| 4,682,114 | A | * | 7/1987 | Aucouturier ............ H01F 19/08 307/106 |
| 5,391,998 | A | * | 2/1995 | Symons ................... H03K 3/55 327/181 |
| 6,066,901 | A | * | 5/2000 | Burkhart ................. H03K 3/57 307/106 |
| 6,965,215 | B2 | * | 11/2005 | MacDougall ............ H03K 3/53 320/139 |
| 2006/0126680 | A1 | | 6/2006 | Boutoussov |
| 2008/0205098 | A1 | | 8/2008 | Xu et al. |
| 2010/0298825 | A1 | * | 11/2010 | Slizynski ............. A61B 18/042 606/41 |
| 2014/0327426 | A1 | * | 11/2014 | Shterzer .................. H03K 3/35 323/364 |

OTHER PUBLICATIONS

Sarjeant et al., "Transmission Lines and Pulse-Forming Networks", High Power Electronics, TAB Books, 1989, pp. 117-136.

\* cited by examiner

ELECTROMAGNETIC DC PULSE POWER SYSTEM INCLUDING INTEGRATED FAULT LIMITER

GOVERNMENT CONTRACT

This invention was made with Government support under N000024-12-C-4223 Technical Instruction #1 awarded by the United States Navy. The Government has certain rights in the invention.

BACKGROUND

The present disclosure relates to electromagnetic pulse power systems, and more particularly, to high power electromagnetic direct current (DC) pulse power systems including a pulse forming network (PFN).

Electromagnetic DC pulse power systems utilize one or more PFNs to shape and control discrete quantities of energy which are characterized by fast rise-times in either voltage, current or power. Conventional PFNs typically arrange a combination of inductors and capacitors in a transmission line, i.e., circuit network, to yield specific source impedances, specific rise times, and specific fall times. These PFNs typically output high energy levels. For example, conventional PFNs may output voltage levels exceeding 100 kilovolts (kV), current levels exceeding 10 mega-amps (MA), and power levels ranging from 50 megawatts (MW) to 1 terawatt (TW). If a system fault occurs, such as a short circuit, peak current levels, for example 10 MA, may be inadvertently delivered to components of the PFN such that the pulse power system is damaged beyond repair.

SUMMARY

According to an exemplary embodiment, an electromagnetic direct current (DC) power system includes a plurality of pulse forming networks (PFN) modules. Each pulse forming network (PFN) module includes a PFN circuit, a fault current limiting (FCL) circuit and a cooling system. The pulse PFN circuit is configured to generate a pulsed DC output power. The PFN circuit further includes at least one storage inductor with at least one primary winding having a primary inductance that controls a primary impedance of the PFN circuit. Typically the energy storage inductor is connected in series with the energy storage capacitor and an electronic commutating device or electromechanical circuit interruption element. The FCL circuit includes a secondary winding that is magnetically coupled with the primary winding. The FCL circuit is configured to receive fault energy existing in the PFN circuit during a fault event. The cooling system is configured to cool at least one of the primary winding and the secondary winding. The FCL secondary winding provides high voltage isolation from the primary winding to assist with fault reduction and to enhance overall safety.

According to another exemplary embodiment, a pulse forming network (PFN) module comprises a PFN circuit configured to generate a pulsed DC output power. The PFN circuit includes a storage inductor with a primary winding having a primary inductance that controls a primary impedance of the PFN circuit. The PFN module further includes a fault current limiting (FCL) circuit. The FCL circuit includes a secondary winding configured to magnetically couple with the primary winding and to receive fault energy existing in the PFN circuit during a fault event, and to dissipate fault energy.

According to another exemplary embodiment, a method of protecting an electromagnetic DC power system from fault energy delivered to a pulse forming network (PFN) circuit during a fault event comprises electromagnetically coupling a fault current limiting (FCL) circuit to the PFN circuit. The method further includes detecting the fault event in the PFN circuit, and adjusting the secondary impedance of the FCL circuit to control a primary impedance of the PFN circuit. The method further includes transferring the fault energy from the PFN circuit to the FCL circuit in response to controlling the impedance of the PFN circuit, and protecting sensitive circuit components such as the main switching devices from excessive current levels.

Additional features are realized through various embodiments described in the present disclosure. Other embodiments are described in detail herein and support various features of the claims. For a better understanding of the embodiments and features, the following description and accompanying drawings are provided.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
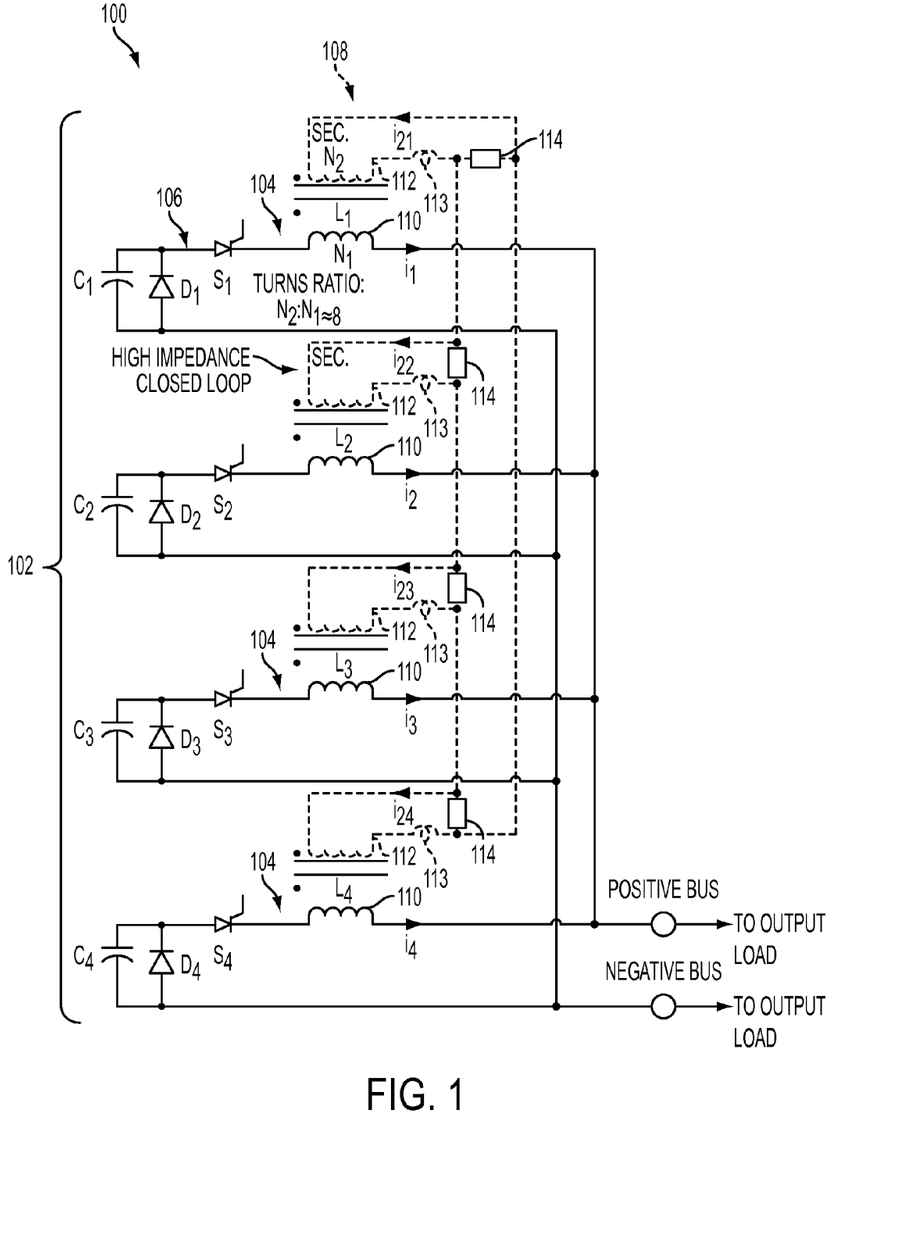
FIG. 1 is a schematic diagram of an electromagnetic DC pulse power system, in accordance with an exemplary embodiment.

Referring to FIG. 1, an exemplary embodiment of an electromagnetic direct current (DC) pulse power system 100 is illustrated. The electromagnetic DC pulse power system 100 includes one or more PFN stacks 102. Each PFN stack 102 includes one or more PFN modules 104. Although a single PFN stack 102 is illustrated, the PFN stack 102 may be part of a larger system of identical PFN modules configured to produce a high-current, fast-pulse output to a common load.

Although the PFN stack 102 illustrated in FIG. 1 includes four PFN modules 104, the number of PFN modules 104 is not limited thereto. For example, the PFN stack 102 may include less than two PFN modules 104 or more than four PFN modules 104.

The PFN stack 102 may generate energy ranging from approximately 1 kilojoule per stack (1 kJ/stack) to approximately 10,000 kJ/stack. In addition, the exemplary embodiment of FIG. 1 illustrates the PFN modules 104 arranged in a common PFN stack 102. The PFN modules 104 may be connected according to various electrical schemes. For example, individual modules of the PFN stack 102 may be electrically connected in parallel with adjacent PFN modules 104 to increase overall current output of the complete system to be additive. In another example, individual PFN modules 104 may be electrically connected in series with adjacent PFN modules 104 to increase overall voltage output of the complete system to be additive. In still another example, individual PFN modules 104 may be electrically connected in both series and parallel connections with adjacent PFN modules 104 to increase overall current and voltage output of the complete system to be additive. In another example, the PFN stack 102 may include PFN modules 104 from multiple different PFN stacks 102.

Each PFN module 104 may utilize a power electronic switching system (not shown) to pulse modulate an input power supplied by an input power supply (not shown) at a fast pulse rate, for example a baseline discharge time of approximately 4.0 milliseconds (ms), to generate high baseline currents and voltages. For example, the PFN module 104 may generate a baseline PFN current having a current level of approximately 100 kA root mean square (RMS), for example, and a corresponding peak current of 140 kA, for example. The baseline charge voltage of each PFN module 104 may have a voltage level of approximately 10 kV, for example. Although each PFN module 104 is described herein as having a common pulse rate, it is appreciated, however, that each PFN module 104 may have its own distinct and different discharge time.

Each PFN module 104 comprises a PFN circuit 106 and a fault current limiting (FCL) circuit 108. The PFN circuit 106 is configured to generate a primary current $i_1$. The PFN circuit 106 includes a primary capacitor $C_X$, a clamp diode $D_X$, an electronic discharge switch (e.g., a thyristor switch assembly) $S_X$, and a storage inductor primary winding 110. The primary capacitor $C_X$ is configured to store energy provided by a DC power supply, and may discharge the energy to primary winding 110 upon closing of the electronic discharge switch $S_X$, and the primary winding 110 transfers the pulsed energy to a common load circuit connected to a positive and negative bus. Switching of each PFN module 104 into a common load may be achieved using an array of solid-state thyristor switch assemblies. The thyristor switch assemblies are sequentially switched in time to shape the output pulse of a respective PFN module 104 according to a predetermined wave-shape such as a square or triangular wave, for example. According to at least one embodiment, the pulsed energy occurs within a half-period of (e.g., 1.0 ms). The general method described is applicable for half-periods down to the nano-second range.

The speed at which a PFN module 104 can switch and shape pulses is largely dependent on the characteristic time-constant of the power circuitry and how fast a commutating device can deplete or transfer their reverse recovery charge (Qrr). Reverse recovery refers to the ability of a device to commutate current and then within microseconds being able to block cathode to anode voltage again. The decay rate (e.g., di/dt) of the on-state current provides an indication of the depletion/transfer of Qrr. Accordingly, reducing di/dt at or near the zero crossing of current ultimately improves the ability of the commuting device 114 to commute regular or fault current.

The FCL circuit 108 may electromagnetically couple with the PFN circuit 106, while being galvanically isolated therefrom to form an isolated electrical current loop. The isolated electrical current loop allows use of external electrical components in the secondary FCL circuit that enhances control of the inductance of the primary winding 110 as discussed in greater detail below. By controlling the inductance the primary winding 110, the impedance of a respective PFN circuit 106 may controlled to reduce the fault current flowing through the PFN circuit 106 during a fault event. For example, the FCL circuits 108 may be configured to reduce both maximum di/dt and maximum absolute current. Accordingly, the FCL circuit 108 may prevent damage of components included in the PFN circuit 106 during a fault event, such as a short circuit, and may provide an overall reduction in the volume and size of the electromagnetic DC pulse power system 100. In further regards to FIG. 1, which includes PFN stacks 102 having a plurality of PFN modules 104 and therefore a plurality of FCL circuits 108, the combination of the FCL circuits 108 may assist in distributing fault energy resulting from an electrical fault equally among the plurality of PFN modules 104.

The FCL circuit 108 includes a secondary winding 112 and a commutating device 114. The secondary winding 112 may be a high voltage winding and may have a number of turns ($N_2$) that control the impedance of the winding. The high voltage realized by the secondary winding 112 may include a voltage level ranging from approximately 15 kV to approximately 40 kV. The number of turns ($N_2$) of the secondary winding 112 may be different from the number of turns ($N_1$) of the primary winding 110. By adjusting the turns of the primary winding 110 and secondary winding 112, the respective inductances may be adjusted as understood by those ordinarily skilled in the art. The use of a high impedance secondary circuit also allows reduction of overall system volume and weight for a given fault energy capability. Accordingly, an impedance differential between the PFN circuit 106 and the FCL circuit 108 may be generated based on the inductances of the primary winding 110 and secondary winding 112. In at least one embodiment, $N_2$ is determined according to a turn ratio with respect to the primary winding 110. For example, $N_2$ with respect to $N_1$ may be 8 (e.g., $N_2:N_1=8$). Accordingly, the impedance of the FCL circuit 108 may be greater than the impedance of the PFN circuit 106 by a factor of $(N_2/N_1)^2$ or 64. Thus the commutating switch in the secondary loop is only exposed to a fraction of the fault current as seen in the primary switching devices.

The commutating device 114 is interposed between opposing ends of the secondary winding 112 and is configured selectively to operate in an enabled mode or a disabled mode based on the existence of a fault event. The commutating device 114 may include, but is not limited to, a fuse, a pyrotechnic triggered fuse, a solid-state switch, and a thyristor. In at least one exemplary embodiment, the commutating device 114 may include a supplemental current sensor 113 to detect the fault event in current $i_{21}$-$i_{24}$. The commutating device 114 illustrated in FIG. 1 may have a voltage threshold ranging from about 10 kV to about 35 kV, for example. A fault detecting device, such as a current sensor 113 connected to the secondary winding may detect the fault event and output a trigger signal to the commutating device 114 indicating the fault event as discussed in greater detail below. Also, the electronic discharge switch $S_X$ and associated current sensor in circuit 106 may output the trigger signal when a current level $i_1$, $i_2$, $i_3$ or $i_4$ exceeds a current threshold, for example. In another embodiment, however, the commutating device 114 may output the trigger based upon a current rate threshold representative of the rate of rise of current (di/dt) in either the PFN circuit 106 and/or the FCL circuit 108, as opposed to an absolute current level threshold.

The commutating device 114 may selectively operate in an enabled mode and a disabled mode based on the level of current flowing through the PFN module 104. If the current level is below a current threshold, the commutating device 114 may operate in the enabled mode, that is, it remains in a closed state. If the current level exceeds the current threshold, the disabled mode is initiated. Accordingly, the commutating device 114 operates in an open state such that the inductance of the respective primary windings 110 is increased, and the fault current flowing through the corresponding PFN module 104 is reduced. The current threshold may be determined by the commutating device 114, or by a separate current sensing device that outputs a fault signal to the commutating device 114 indicating the existence of a fault event.

When operating in the enabled mode, the commutating device 114 effectively connects the first and second ends of the secondary winding 112 together (i.e., short circuits the ends of secondary winding 112 together). Accordingly, the effective inductance transferred to the respective primary winding 110 is reduced as understood by those ordinarily skilled in the art. Therefore, when no fault events exist the commutating devices 114 operate in the enabled mode to electrically connect together the ends of the respective secondary winding 112, such that the primary windings 110 realize a minimal inductance. In at least one exemplary embodiment, the minimal inductance of each primary winding ranges from approximately 40 microhenries (μH) to approximately 90 μH when the commutating device operates in the enabled mode.

If one or more current sensors 113 in FCL circuit 108 detect a fault event (e.g., a short circuit that causes a current level to exceed a current threshold), each of the commutating devices 114 initiates the disabled mode. The disabled mode opens (i.e., disconnects) the connection between the first and second ends of a respective secondary winding 112. Accordingly, the second windings 112 are placed in series with one another instead of being isolated to a closed loop such that the impedance of the secondary windings 112 changes. The disabled mode of each commutating device 114 may be initiated to achieve an instantaneous change in the FCL circuit 108 impedance, or may be sequentially (i.e., staggered) initiated to obtain a gradual change in the FCL circuit 108 impedance.

The changed impedance of the secondary windings 112 is realized by a respective primary winding 110, thereby increasing the inductance of the respective primary winding 110. In at least one embodiment, the increased inductance of each primary winding ranges from approximately 90 μH to approximately 300 μH. The increased inductance of the primary windings 110 reduces the current level of a fault current flowing through the respective PFN circuit 106. Further, by placing each of the FCL circuits 108 included in the PFN module 104 in series with one another, the fault energy (e.g., the increased energy caused by a fault event) may be equally distributed among each PFN module 104 included in the PFN stack 102. Accordingly, the combination of the FCL circuit 108 and the primary winding 110 of the PFN circuit 106 may protect the switching assembly from irreversible damage during a fault event. The change of inductance illustrated above allows, for example, the maximum fault current to be less than 100 kA instead of 300 kA.

Figure 2:
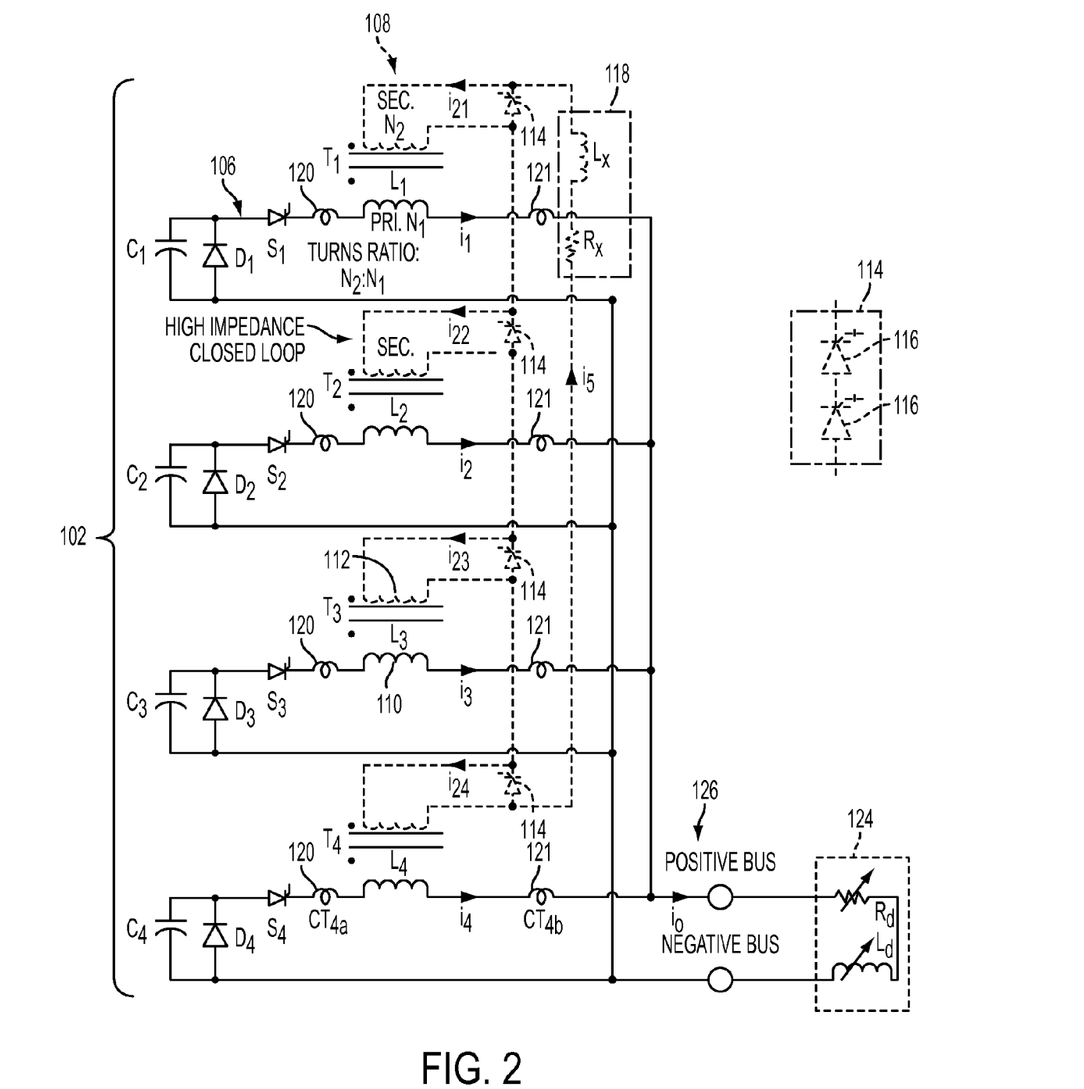
FIG. 2 is schematic diagram of an electromagnetic DC pulse power system, in accordance with another exemplary embodiment.

Referring now to FIG. 2, another exemplary embodiment of an electromagnetic DC pulse power system 100 is illustrated, which utilizes solid-state switches 116, such as a gate turn off (GTO) thyristor switch 116, as the commutating device 114. Although GTO thyristor switches 116 are illustrated in FIG. 2, other solid-state switches 116 may be used including, but not limited to, an integrated gate commutated thyristor (IGCT).

The electromagnetic DC pulse power system 100 of FIG. 2 also includes an external protection circuit 118 and one or more current detectors 120, 121 in the primary circuit. The external protection circuit 118 includes a discrete resistor $R_X$ and a discrete external inductor $L_X$. The $L_X$ is configured to provide additional inductance to the FCL circuit 108 such that the external protection circuit may provide increased protection from high fault current levels.

The current detectors may include a current transformer (CT) 120, 121 for example. The CT 120 is configured to detect a fault event and control the solid-state switch 116 to initiate the disabled mode. In at least one embodiment, a first CT 120 may be disposed upstream from the primary winding 110 and a second CT 121 may be disposed downstream from the primary winding 110 may to increase the sensitivity for detecting a fault event. In particular, the system of 120 and 121 allow for differential current monitoring of the storage inductor and can pinpoint a line to ground fault within the storage inductor primary winding 110.

For example, $CT_1$ 120 monitors the FCL loop current $i_1$ and outputs the measured current. A control system (not shown) may analyze the measured $i_1$. A terminal and/or internal fault event may cause the primary current $i_1$ to exceed a threshold level ($TH_I$). The $CT_1$ 120 triggers the group of GTO thyristor switches 116 open. The GTO thyristor switches 116 may be opened approximately 50 μs after the CT 120 detects the fault. When primary current exceeds the threshold, so does secondary current $i_2$ through the respective secondary windings 112. In at least one exemplary embodiment, the secondary to primary winding impedance ratio is 36:1 and may be achieved according to a turns ratio N2:N1 of 6:1. Therefore, a 91 kA main fault current is reflected as a 15.2 kA current in the FCL circuit 108. When the GTO thyristor switches 116 opens, all secondary windings 112 may be immediately placed in "series aiding". Accordingly, a total loop inductance is provided, which equals a sum of the individual FCL self-inductances and any external FCL loop inductance provided by the external protection circuit 118 (i.e., $R_X$ and $L_X$). The secondary loop impedance (Z) may be represented as $Z=R_X+j\omega L_X$ since fundamentally secondary loop current contains an alternative current component at radian frequency ω by virtue of the transformer coupling present.

The FCL circuit 108 is configured to limit the maximum di/dt during a fault event (e.g., a short circuit). As mentioned above, the fault event is detected when the current (i.e., the primary current) flowing through the PFN circuit 106 exceeds a current threshold. One or more CTs 120 may be configured to determine if di/dt exceeds a threshold ($TH_{di/dt}$), and may control the commutating device 114 to initiate the disabled mode. The disabled mode maintains di/dt below $TH_{di/dt}$ and maintains critical transient voltage (dv/dt) below a voltage rate threshold ($TH_{dv/dt}$). As a result, the commuting device 114 can effectively commutate the fault current. The $TH_{di/dt}$ may be, for example, about 1000 A/μs, and the dv/dt may be, for example, 2000 V/μs.

Figure 3:
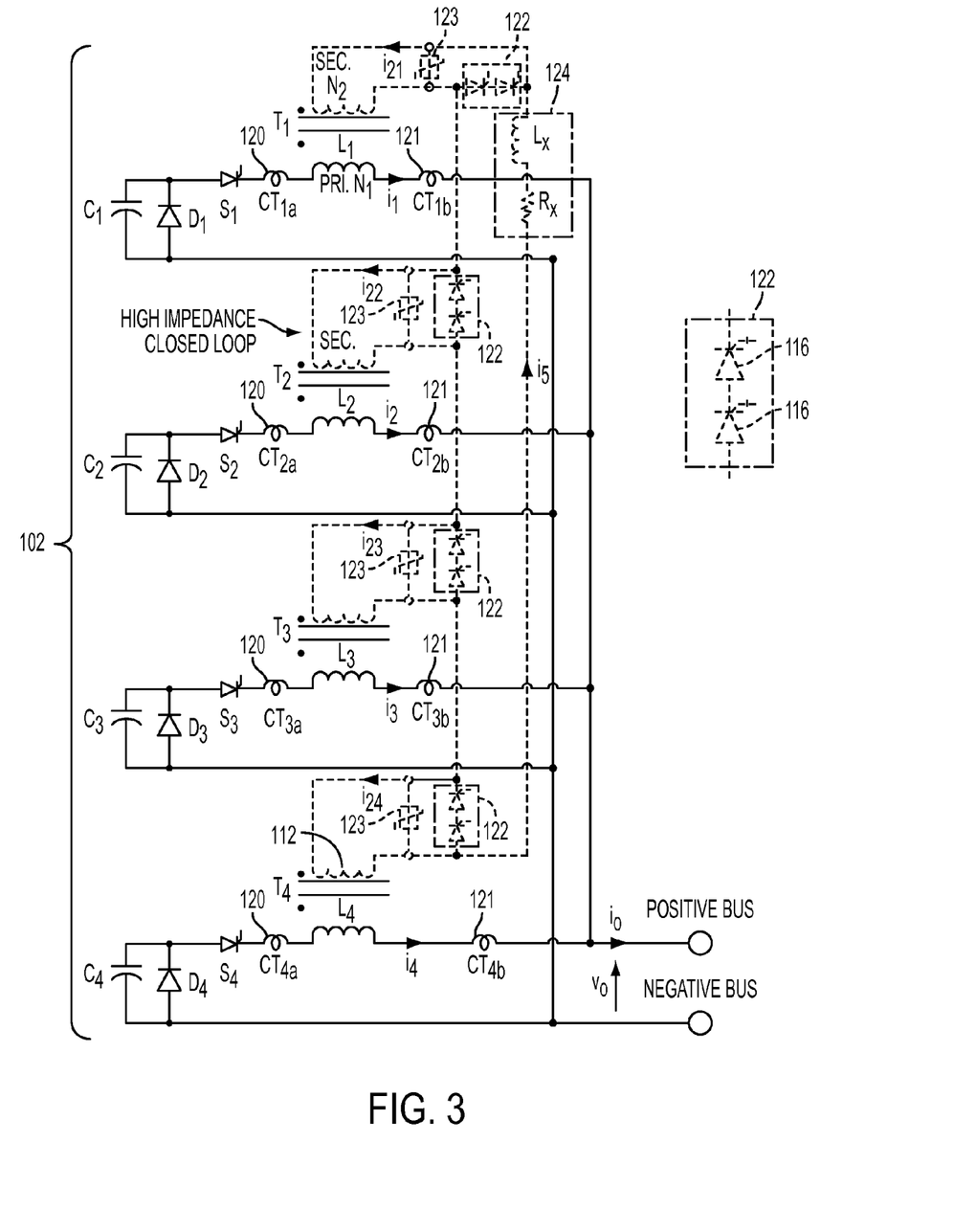
FIG. 3 is schematic diagram of an electromagnetic DC pulse power system, in accordance with yet another exemplary embodiment.

Referring now to FIG. 3, another exemplary embodiment of a DC pulse power system 100 is illustrated. The FCL circuit 108 of includes a series solid-state commutating device 122 having a pair of GTO thyristor switches 116. Each pair of GTO thyristor switches 116 may be connected in series arrangement with respect to one another but in parallel with device 123. When the FCL circuit 108 is enabled, (i.e., when the commuting device 114 operates in the enabled mode) the closed loop currents $i_{21}$, $i_{22}$, $i_{23}$, and $i_{24}$ are confined to a local loop of the secondary winding 112, as discussed above. Each FCL circuit 108 may further include a metal oxide varistor (MOV$_X$) 123 connected in parallel with a respective commutating device 122 and the complete circuit has external impedance 120 included. The MOV$_X$ 123 may limit over-voltage across the secondary winding 112 during a voltage transient event.

Figure 4:
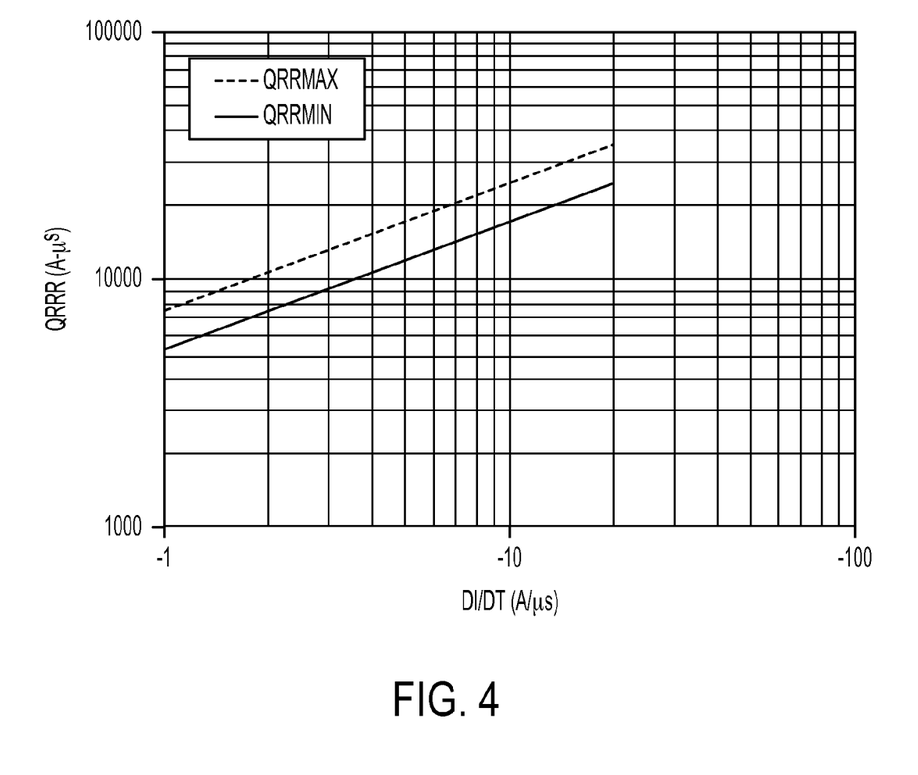
FIG. 4 is a diagram illustrating a recovery charge vs. rate of change of current of a solid-state commutating device included in an electromagnetic DC pulse power system operating in a current commutating mode.

The GTO thyristor switches 116 may have a reverse recovery charge of approximately 6500 Amp-microseconds (A-μs) to approximately 9500 (A-μs), for example. In at least one embodiment, the GTO thyristor switches 116 included in each PFN module 104 may have the same Qrr. For example, the thyristor switches may each have a blocking voltage of, for example, 6000 Volts such that each pair of GTO thyristor switches 116 switches may have nearly equal voltage distribution across them (by use of a divider network). The reverse current rate of the GTO thyristor switches 116 increases, for example when di/dt is −3.0 A-μs, and Qrr increases to a value of −14,000 A-μs (see FIG. 4). This moderately high value of Qrr is indicative of state of the art high power switching devices but nevertheless allows rapid commutation of currents $i_{21}$ to $i_{24}$ to proceed into the high impedance closed loop 108 of current $i_5$ and thereby transfer current into external impedance element 124 to effect a sudden impedance change as reflected in the primary windings of $L_x$.

When the commutating devices 114 are triggered, a secondary loop comprising the FCL circuits 108 (e.g., the four individual FCL circuits 108) may be formed. In a secondary loop, the voltage on the combined leakage inductances may be as high as 80 kV; this is tolerable since it is dispersed across four distinct modules. This defines the impulse voltage rating of the insulation system to ground as 100 kV. Since the fault current must be rapidly commutated, the commutating devices 114 (e.g., a pyrotechnic fuse, GTO thyristor, etc.) must produce a back voltage (peak) of at least 3.0 per unit voltage of the PFN system input or charging voltage.

Figure 5:
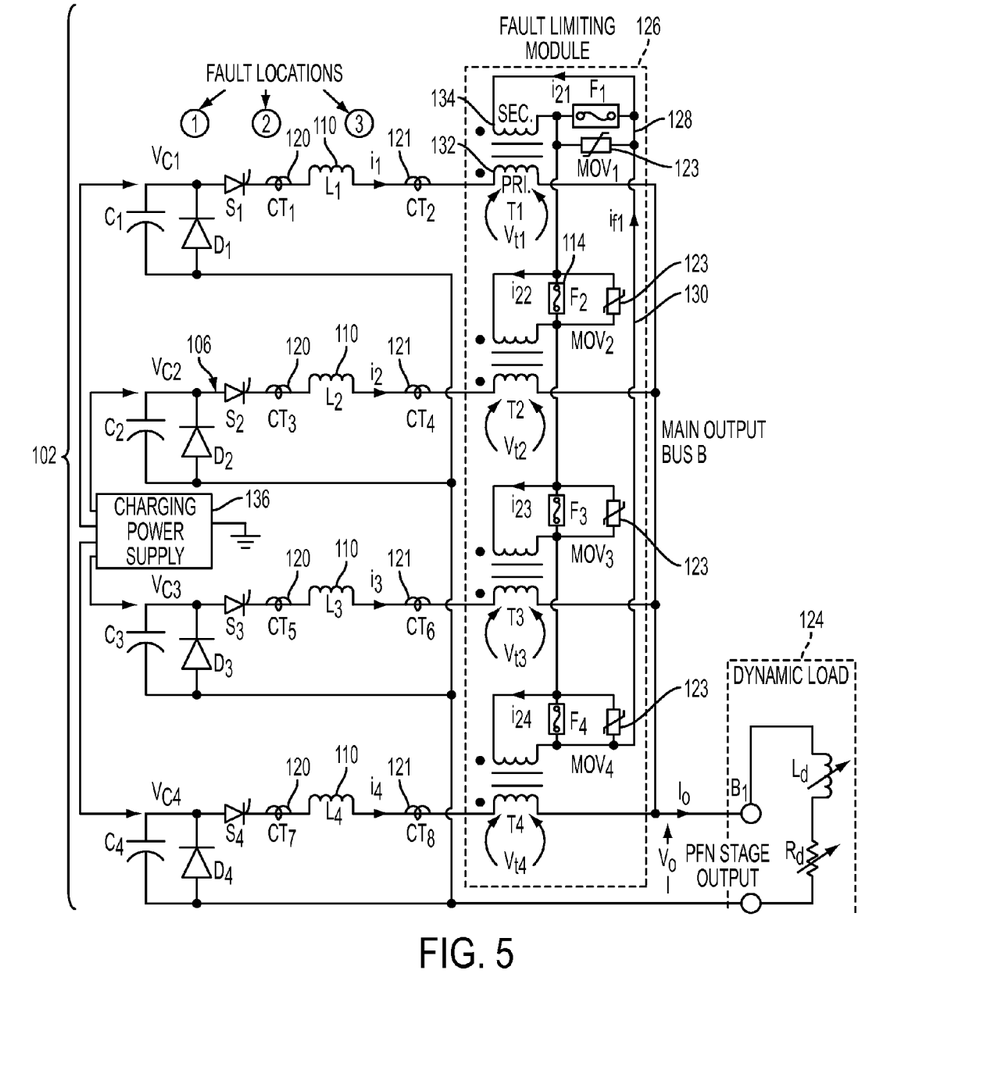
FIG. 5 is schematic diagram of an electromagnetic DC pulse power system, in accordance with still another exemplary embodiment.

Referring to FIG. 5, yet another embodiment of an electromagnetic DC pulse power system 100 is illustrated. The electromagnetic DC pulse power system 100 includes a PFN stack 102 connected to dynamic load 124. The dynamic load 124 is shown as a combination of an inductor $L_d$ and resistor $R_d$ with time-varying component values. It is appreciated, however, that the dynamic load 124 may also consist of a combination of resistive, capacitive and inductive elements with one or more of these elements having a time dependent value. Moreover, the inductance $L_d$ in addition to being time dependent may also be non-linear for its value of inductance versus current.

The PFN stack 102 includes, for example, four PFN circuits 106 and an FCL module 126. The PFN circuits 106 operate as described in detail above. The FCL module 126 comprising one or more FCL units 128 that include a commutating device 114 and specialty transformer $T_1$-$T_4$. When the commutating devices 114 are opened, an isolated closed-loop FCL bus 130 is formed. Each FCL unit 128 is magnetically connected to a respective PFN circuit 106. For example, a first primary winding 110 of a first PFN circuit 106 is connected to a first main winding 132 of the specialty transformer of a first FCL unit 128. The inductor $L_1$-$L_4$ does not have a secondary winding.

Each FCL unit 128 is arranged as a transformer assembly $T_1$-$T_4$ that is separate from the storage inductor 110 of a respective PFN circuit 106. The transformers $T_1$-$T_4$ include a main winding 132 and an auxiliary winding 134. Each FCL unit 128 further includes a commutating device 114. The commutating devices 114 may be a pyrotechnic fuse 114, for example. Although a pyrotechnic fuse 114 is illustrated in FIG. 5, the commutating device 114 may include, but is not limited to, a GTO thyristor or IGCT device. Each pyrotechnic fuse 114 may be connected in parallel with a MOV$_x$ 123. The auxiliary winding 134 of each transformer $T_1$-$T_4$ may receive respective current $i_{21}$, $i_{22}$, $i_{23}$ and $i_{24}$ and operates as discussed above. In addition, the auxiliary windings 134 modulate the magnetic core flux from the main windings 132 upon the transformer. Accordingly, the primary currents $i_1$-$i_4$ provide greater control of the induction and fault limiting action.

The electromagnetic DC pulse power system 100 of FIG. 5 further includes a DC power supply 136. The DC power supply 136 may generate a DC power, which drives and charges all the PFN circuits 106 either simultaneously or sequentially. It is understood that switching devices $S_1$ through $S_4$, which form the DC power pulse, may include multiple opening switches in series and/or in parallel. The switching devices $S_1$ through $S_4$ have solid-state switches in a preferred embodiment and may include a thyristor, GTO thyristor or an IGCT. The electromagnetic DC pulse power system 100 of FIG. 5 may also include clamp diodes $D_1$-$D_4$, to prevent applying reverse voltage on the energy storage capacitors $C_1$ through $C_4$.

Fault events may occur at various locations (e.g., 1-3) of a PFN circuit 106. Each storage inductor 110 has a differential system of dual current transformers (CT) 120, 121 configured to measure current the level of current flowing through the storage inductor 110. For example, an input $CT_1$ 120 may monitor the input current of a first inductor 110, and an output $C_{T2}$ 121 may monitor the output current of the inductor 110. Accordingly, a differential current protection system may be formed to protect the PFN module 104 from potential ground faults realized. Further, the differential current protection system segregates an internal PFN fault from faults outside the PFN module 104 and helps isolate and identify which PFN module 104 experiences a fault event including, but not limited to, capacitor short circuit, diode open or short circuit, thyristor open or short circuit or inductor open or short circuit.

The transformers T1-T4 also provide a reference point at which a transformer primary voltage ($V_{t1}$-$V_{t4}$) may be determined. $V_{t1}$-$V_{t4}$ may be processed via a control system (not shown) to determine which PFN module has higher or lower than predicted operating characteristics. Based the comparisons of $V_{t1}$-$V_{t4}$, the location of a PFN module 104 experiencing a fault event may be ascertained. The fault limiter circuit of FIG. 5 can have all four commutating devices 114 triggered in a sequential (i.e., staggered) manner such that a more gradual transient voltage appearing on the transformer primaries at $V_{t1}$ through $V_{t4}$.

Figure 6:
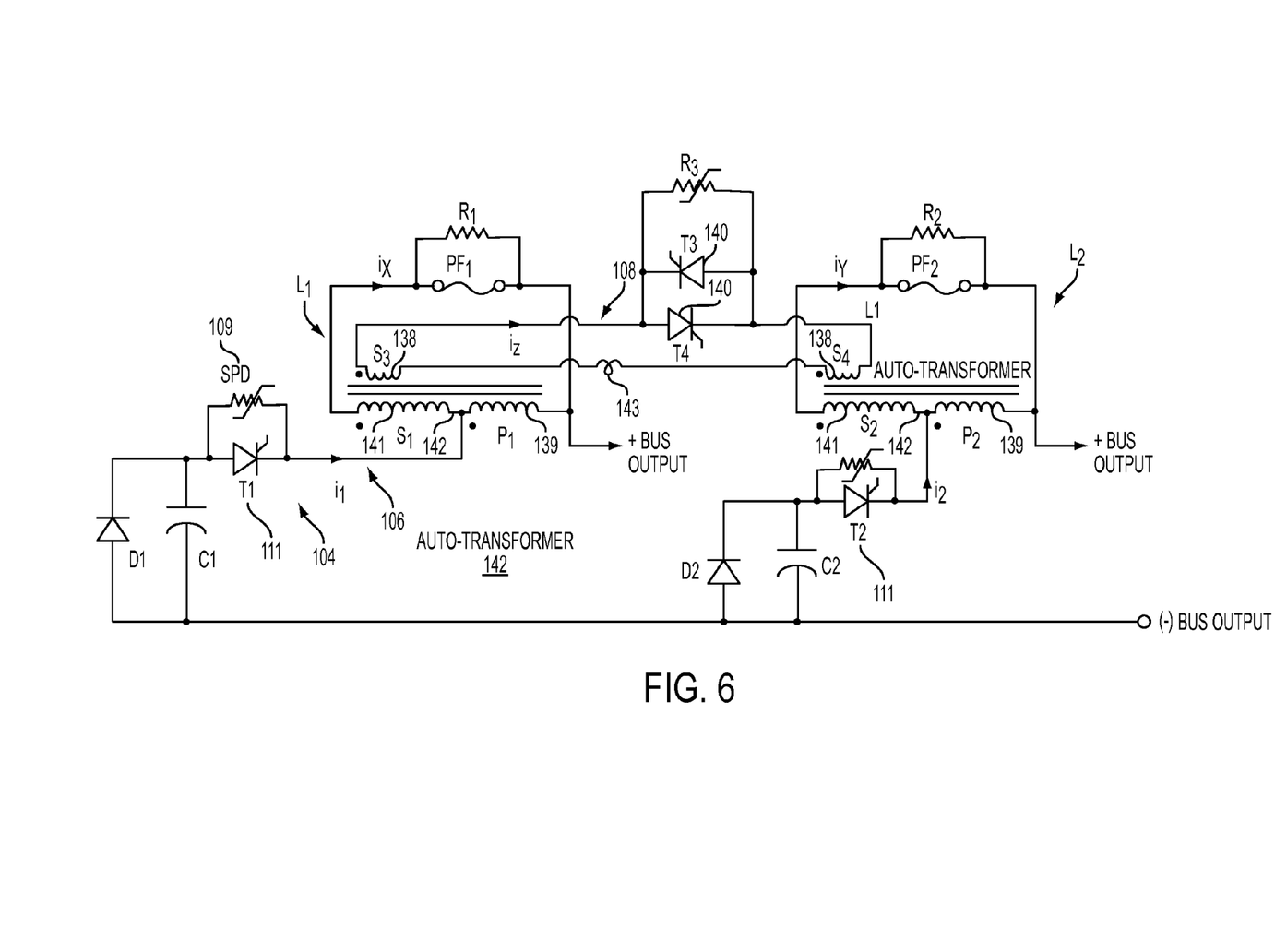
FIG. 6 is schematic diagram of an electromagnetic DC pulse power system, in accordance with another exemplary embodiment.

Turning now to FIG. 6, another exemplary embodiment of the electromagnetic DC pulse power system 100 is illustrated. Each PFN module 104 includes a PFN circuit 106 and an FCL circuit 108 as described in detail above. The FCL circuit 108 according to the exemplary embodiment of FIG. 6 includes one or more electrically isolated windings 138, one or more isolated switching devices 140, and an auto-transformer device 142 with windings 138, 139, 141. Accordingly, a two-stage fault-limiting system is provided, whereby the impedance or inductance of winding 139 is increased upon opening action of isolated switching devices 140, shown arranged as a bilateral switch. The main switching devices 111 have shunt connected surge protective devices 109 and an opening switcher, of either the solid-state devices or pyrotechnic opening devices.

Fault currents can originate at the load end circuit and be driven "backwards" to cause very high current in the primary current $i_1$ and $i_2$ path if, for example, the capacitor $C_1$ or $C_2$ has an internal short circuit. Alternately, if a short circuit occurs at a load external to the electromagnetic DC pulse power system 100, the capacitor $C_1$ and/or $C_2$ may allow for a "forward" high surge current, which may damage other components. The electromagnetic DC pulse power system 100 of FIG. 6 may prevent damage caused by both forward and reverse type of fault currents.

More specifically, the isolated windings 138 are connected in series with an isolated switching device 140, for example a bilateral thyristor pair 140. In a normal state (i.e., a non-fault), the isolated switching device 140 are closed to maintain reflected inductance in the primary windings 139 as low as possible. The primary winding 139 turns ratio of $P_1:S_3$ and $P_2:S_4$ can be arbitrary and allows the auxiliary circuit with current $i_z$ to be implemented as a high voltage, low current circuit. Devices $PF_1$ and $PF_2$ are pyrotechnic trigger fuses connected to auto-transformer windings 139 and 141 and are triggered to open if the fault current in circuit 106 exceeds an upper threshold. For lower level faults, devices 140 are triggered to open. The opening of $PF_1$ and $PF_2$ generates an impedance change as understood by those ordinarily skilled in the art.

The auto-transformer device 142 is configured to reduce the magnetic materials and overall volume of the inductor/transformer combination in comparison to previous embodiments shown in this application. Commutating devices 140 and current sensors 143 detect a high rate of rise (di/dt) of current in either $i_1$ or $i_2$ paths. Accordingly, the effective series inductance of the auto-transformer windings 139 is increased, and the fault current flowing from the main capacitor to the bus (or vice versa) is reduced. After a period of time after triggering the main commutating devices 111 to open, for example about 2-5 ms, a control signal may be output to either $PF_1/PF_2$ or to switch 140 or both to open simultaneously. Accordingly, an additional protection operation may be provided that increases the effective inductance realized by the primary windings $P_1$ and $P_2$. The interconnected circuitry of the $i_z$ current path helps balance the action of the fault limiting among all primaries windings to be magnetically coupled through the auto-transformer. In an exemplary embodiment, the number of turns for the primary windings $(P_1, P_2)$ may be $N_1=2$, the number of turns for the secondary windings (S1, S2) may be $N_2=4$, and the number of turns for the auxiliary windings $(S_3, S_4)$ may be $N_x=8$.

Due to the high power output generated by one or more of the PFN modules 104, the electromagnetic DC pulse power system 100 may further include a cooling system. The cooling system may cool one or more of the PFN modules 104, thereby improving overall operation and reliability of the electromagnetic DC pulse power system 100 as discussed in greater detail below. The cooling system also functions to remove a portion of the PFN fault energy and transferred this waste heat to an external media.

Figure 7:
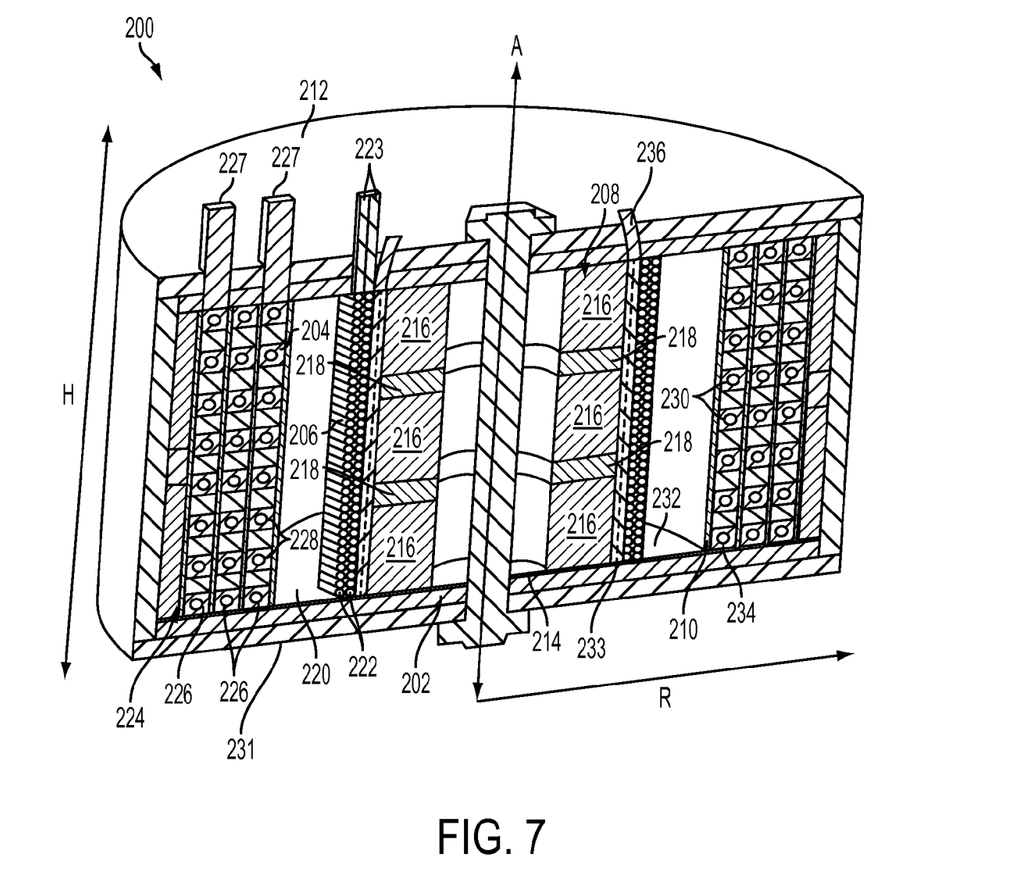
FIG. 7 is a perspective view of a temperature regulating pulse forming network (TRPFN) module according to an exemplary embodiment.

Referring to FIG. 7, a temperature regulating pulse forming network (TRPFN) module 200 is illustrated. The TRPFN module 200 includes an inner housing 202, a primary winding 204, a secondary winding 206, an inner magnetic core 208, a cooling system 210, and an outer housing 212. The inner housing 202 supports the primary winding 204, the secondary winding 206, the inner magnetic core 208, and the cooling system 210. For example, the inner housing 202 may define individual chambers containing the primary winding 204, the secondary winding 206, and the inner magnetic core 208. In at least one embodiment, the TRPFN module 200 may extend axially along a Y-axis to define a height (H) and radially about an axis (A) to define a radius (R).

The inner magnetic core 208 may be disposed in a first chamber 214 of the inner housing 202. The inner magnetic core 208 may be formed from a non-saturating material that is wound circumferentially about the axis (A) within the first chamber 214, and is configured to induce an electromagnetic field when current flows through the primary winding 204 and/or secondary winding 206. The non-saturating material includes, but is not limited to, high cobalt high permeability steels. In at least one exemplary embodiment, the inner magnetic core 208 may include, for example, three segmented magnetic sub-cores 216. The sub-cores 216 may be toroidally wound about the axis (A), and may have a thickness of approximately 10 millimeters (mm), for examples. Each sub-core 216 may be magnetically separated from one another by a core isolator 218 to reduce eddy current losses and reduce the inner magnetic field. The core isolator 218 may include, for example, an air gap 218 or a solid dielectric material such as polypropylene, nylon or fiberglass epoxy.

The secondary winding 206 may be contained in a second temperature regulating chamber 220 of the inner housing 202. The second chamber 220 may be disposed adjacent to the first chamber 214 such that the secondary winding 206 may control the inductance of the primary winding 204 as discussed in detail above. The secondary winding 206 may be formed as one or more winding layers 222. The secondary winding 206 in each winding layer 222 is wound to form a number of secondary turns. The number of turns of the secondary winding 206 is greater than the number of turns of the primary winding 204. Accordingly, the impedance of the secondary winding 206 is greater than the impedance of the primary winding 204. Referring FIG. 7, for example, the secondary winding 206 may be formed as two winding layers 222 having a total of 72 turns. The number of layers and/or the number of turns however, are not limited thereto. The secondary winding 206 may also include secondary terminals 223 to connect the secondary winding 206 to a FCL circuit 108.

The primary winding 206 may be disposed in a third chamber 224 that surrounds the second chamber 220. In at least one exemplary embodiment, the primary winding 204 may include a plurality of turns, for example 24 turns, in series with one another. More specifically, the third chamber 224 may include a plurality of sub-chambers 226 extending along the Y-direction (i.e., the height) of the inner housing 202. The primary winding 204 may also include primary terminals 227 to connect the primary winding 204 to a PFN circuit 106 as shown in FIG. 2.

The sub-chambers 226 are disposed next to one another and are configured to receive a primary winding conductor 228 of the primary winding 204. The primary winding 204 may be toroidally wound in the sub-chambers 226 such that primary winding 204 portions are spaced apart from one another primarily to increase dielectric strength. The number of primary winding conductors 228 in each sub-chamber 226 may be equal. Referring still to FIG. 7, the number of turns formed by the primary winding 204 may comprise, for example, eight turns in series per layer. A combination of the primary winding conductors 228 contained in a single sub-chamber 226 may define a primary layer that extends in the height-direction (H) of the TRPFN module 200. Since the exemplary embodiment of FIG. 7 illustrates eight turns per sub-chamber 226, the primary winding 204 includes a total of twenty-four winding turns. Although a total of three primary winding layers and three sub-chambers 226 are illustrated in FIG. 7, the number of sub-chambers 226 and/or the number of primary winding portions in each sub-chamber 226 are not limited thereto.

The primary winding 204 may be formed from various electrically conductive materials including, for example, copper. The primary winding 204 may also be formed of various cross-sectional shapes including, but not limited to, circular-shaped and square-shaped. In at least one embodiment, a first primary winding conductors 228 may be wound in a first sub-chamber 226 to define a first diameter ranging from approximately 8 inches to approximately 9 inches, for example. A second primary winding conductors 228 may be wound within a second sub-chamber 226 to define a second diameter ranging from approximately 9 inches to approximately 10 inches, for example. A third primary winding portion 228 may be wound within a third sub-chamber 226 to define a third diameter ranging from approximately 10 inches to approximately 11 inches, for example. As further illustrated in FIG. 7, the primary winding 204 is separated from the secondary winding 206 by a distance of approximately 2 inches, which generates a loose coupling between the primary windings 204 and secondary winding 206.

The cooling system 210 is configured to cool the primary winding 204 and/or the secondary winding 206. A portion of the PFN fault energy is dissipated in the primary and secondary windings which is subsequently transferred to an external heat exchanger or external media. In at least one exemplary embodiment, the cooling system 210 includes a primary cooling system 230 that cools the primary winding 204 and a secondary cooling system 232 that cools the secondary winding 206. The cooling system 230 may be direct liquid-injection and the cooling system 232 may be indirect conduction mechanism. The primary cooling system 230 may be configured differently than the secondary cooling system 232, as discussed in greater detail below.

The primary cooling mechanism is formed as an integrated cooling system 230 that is integrated with the primary winding 204. In at least one exemplary embodiment illustrated in FIG. 7, the primary cooling system 230 includes a channel 234 formed through approximately the center of the primary winding 204. A primary coolant may be flowed or injected through the channel 234, thereby providing an internal cooling feature that cools the primary winding 204 from within. The primary coolant may include, but is not limited to, water, mineral oil and hydrofluoroether (HFE), or fluoroketones for example.

The primary cooling system 230 may be formed as a single phase cooling system or a two-phase liquid cooling system. The two-phase cooling system may include a two-phase liquid and gas cooling system. In another embodiment, the primary cooling system 230 may include a chill plate and/or an auxiliary cooling device 231. The chill plate and/or an external cooling device may be in thermal communication with the primary winding 204 to reduce the heat thereof.

The secondary cooling system 232 may be formed in combination with the second chamber 220. More specifically, in addition to containing the secondary winding 206, the second chamber 220 may be configured to contain a secondary coolant that surrounds the secondary winding 206. The secondary coolant contained in the second chamber 220 may include a non-flammable, high-dielectric, high electrical resistivity fluid such as, for example, HFE.

The secondary cooling system 232 may be formed as a two-phase liquid and gas cooling system. In another embodiment, the secondary cooling system 232 may include a chill plate and/or an external cooling device. The chill plate and/or an external cooling device may be in thermal communication with the secondary winding 206 to reduce the heat thereof. For example, the auxiliary cooling device 232 may be a liquid coaxial-shaped annulus with internal cooling channels and may include one or more cooling lines 236 interposed between one or more wound portions of the secondary winding 206. The cooling lines 236 may flow a coolant therethrough, thereby cooling the secondary winding 206. The cooling system transfer heat from the primary and secondary windings to an external heat exchanger (not shown), represents a portion of the subject PFN fault energy. Similarly, the portion of PFN fault energy dissipated as heat in resistor Rx in element 120 FIG. 3 must also be removed from the described apparatus and transferred to an external heat exchanger or external media.

The outer housing 212 surrounds the inner housing 202. In at least one exemplary embodiment, the outer housing 212 is formed from a highly conductive material and is disposed against the inner housing 202. The highly conductive material of the outer housing 212 may include, but is not limited to, aluminum or brass. Accordingly, the outer housing 212 may be configured as an electromagnetic shield that inhibits electromagnetic waves emitted from the TRPFN module 200.

Figure 8:
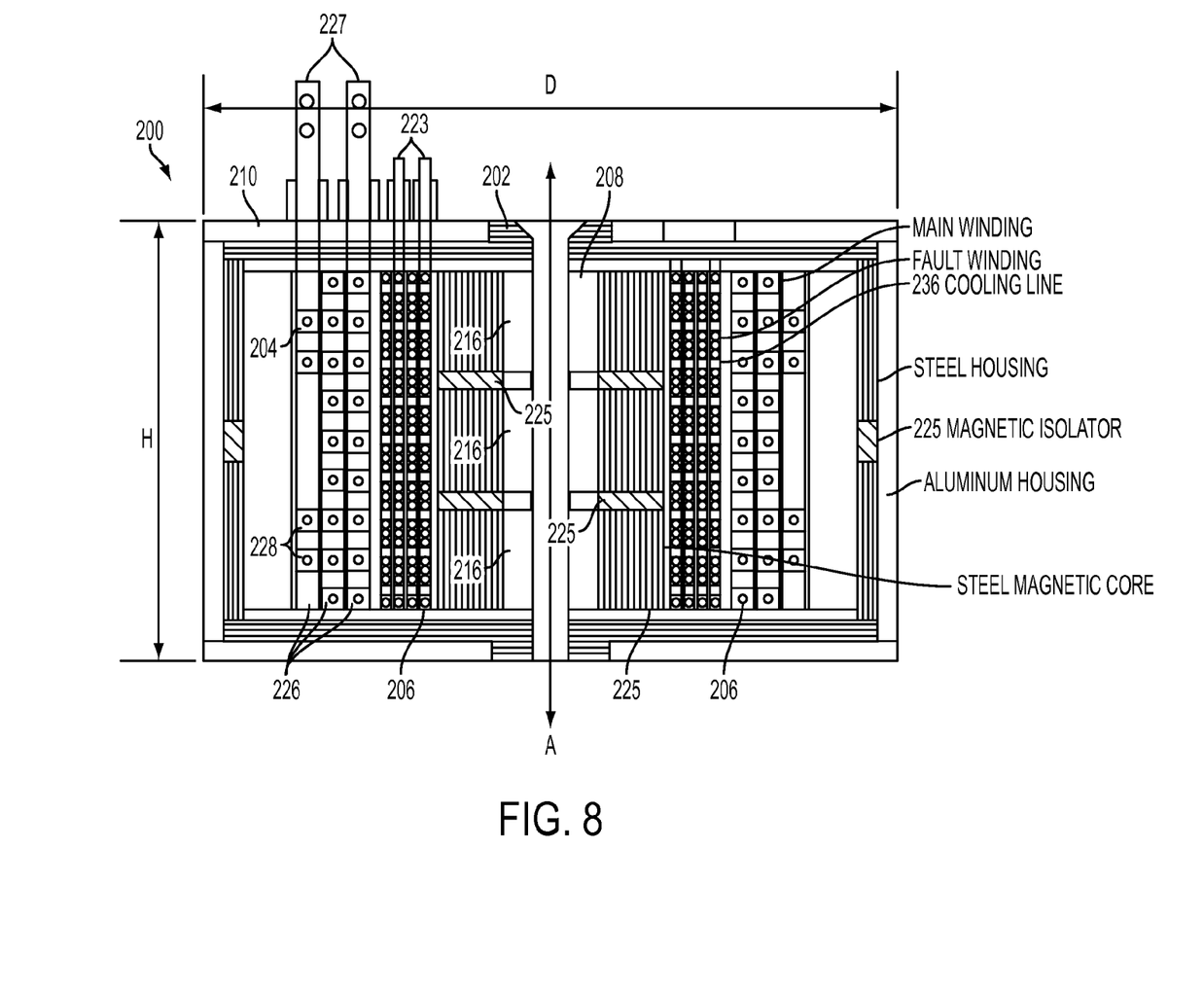
FIG. 8 is a cross-sectional view of a temperature regulating pulse forming network (TRPFN) module according to another exemplary embodiment.

Another embodiment of a TRPFN module 200' is illustrated in FIG. 8. The TRPFN module 200' is similar to the TRPFN module 200 of FIG. 7; however, the number of primary winding portions 228 per layer included in the sub-chambers 226 is unequal to taper the internal magnetic field and this has a higher primary to secondary coupling coefficient than in FIG. 7. In addition, the secondary winding 206 may be formed as four layers instead of the two layers illustrated in FIG. 7. Accordingly, the turns ratio (i.e., $N_2:N_1$) of the primary windings 204 with respect to secondary windings 206 may be, for example, 6 secondary winding turns for a single primary winding turn (i.e., 6:1). Further, the radial separation between primary winding 204 and the secondary winding 206 may be decreased to approximately 0.5 inch. Magnetic isolators 225 are shown in both the outer steel housing and in the inner core. The magnetic isolators 225 may control the saturation of the overall magnetic circuit. The saturation may be controlled due to a quasi-linear inductance versus current characteristic that is obtained at high fault currents. The smaller radial separation between windings of FIG. 8 forms a higher magnetic coupling between the primary winding 204 and secondary winding 206 instead of the loose coupling illustrated in FIG. 7. Also the time constant of the embodiment of FIG. 8 is shorter than FIG. 7 since the inner magnetic cores use laminated electrical high permeability steel of smaller total volume.

Figure 9:
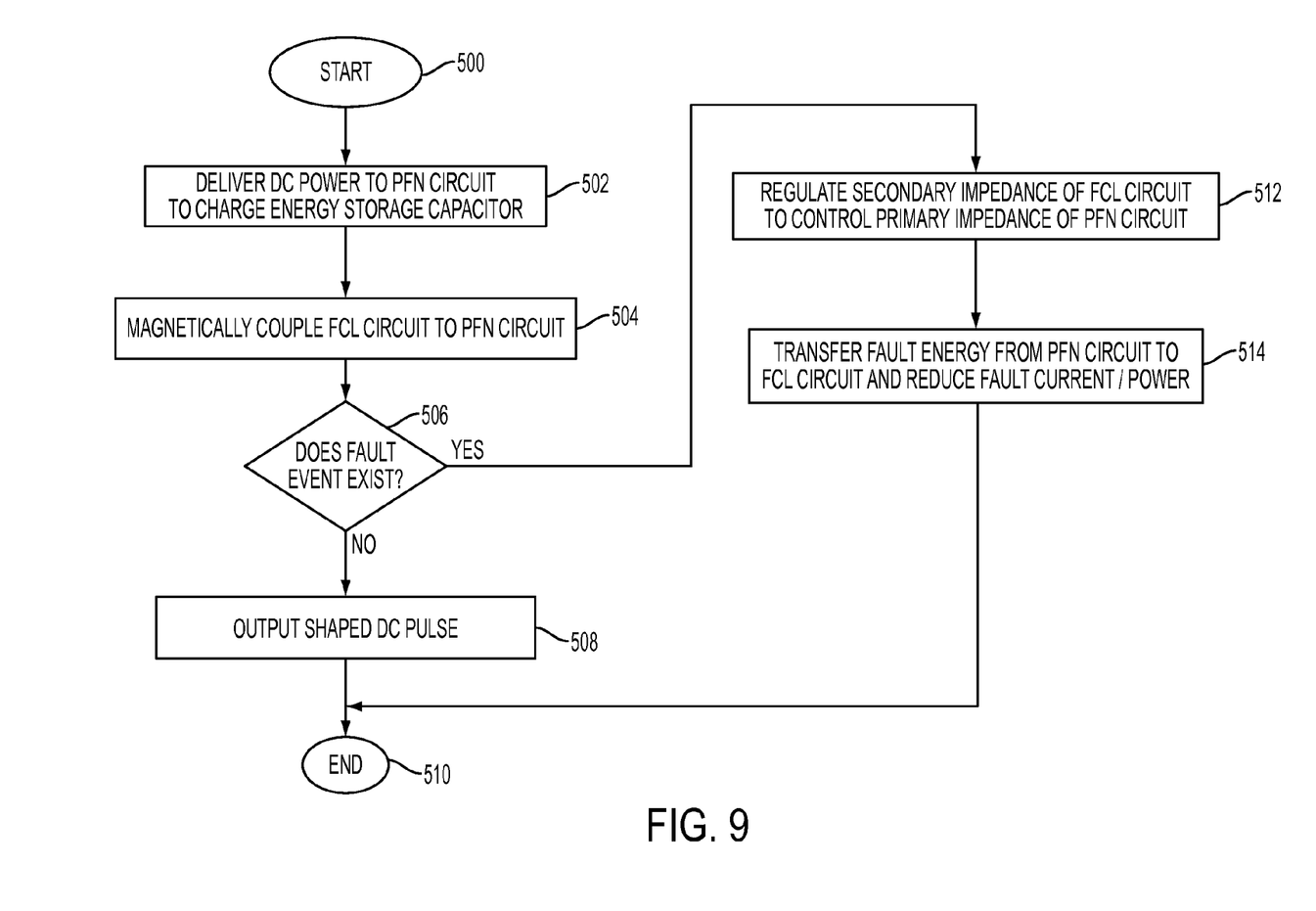
FIG. 9 is a flow diagram illustrating a method of protecting an electromagnetic DC pulse power system in response to a fault event according to an exemplary embodiment.

Turning now to FIG. 9, a method of protecting an electromagnetic DC pulse power system in response to a fault event is illustrated. The method begins at operation 500 and proceeds to operation 502 to deliver DC power to a pulse forming network (PFN) circuit. At operation 504, a fault current limiting (FCL) circuit is magnetically coupled to the PFN circuit. At operation 506, a determination as to whether a fault event exists. If the fault event does not exist, a shaped DC pulse is output from the electromagnetic DC pulse power system at operation 508 and the method ends at operation 510.

If the fault event is determined at operation 506, the secondary impedance of the FCL circuit is regulated to control a primary impedance of the PFN circuit at operation 512. At operation 514, a portion of the fault energy from the PFN circuit is transferred to the FCL circuit in response to controlling the impedance of the PFN circuit, thereby lowering the prospective primary fault current and fault power and the method ends at operation 510.

Figure 10:
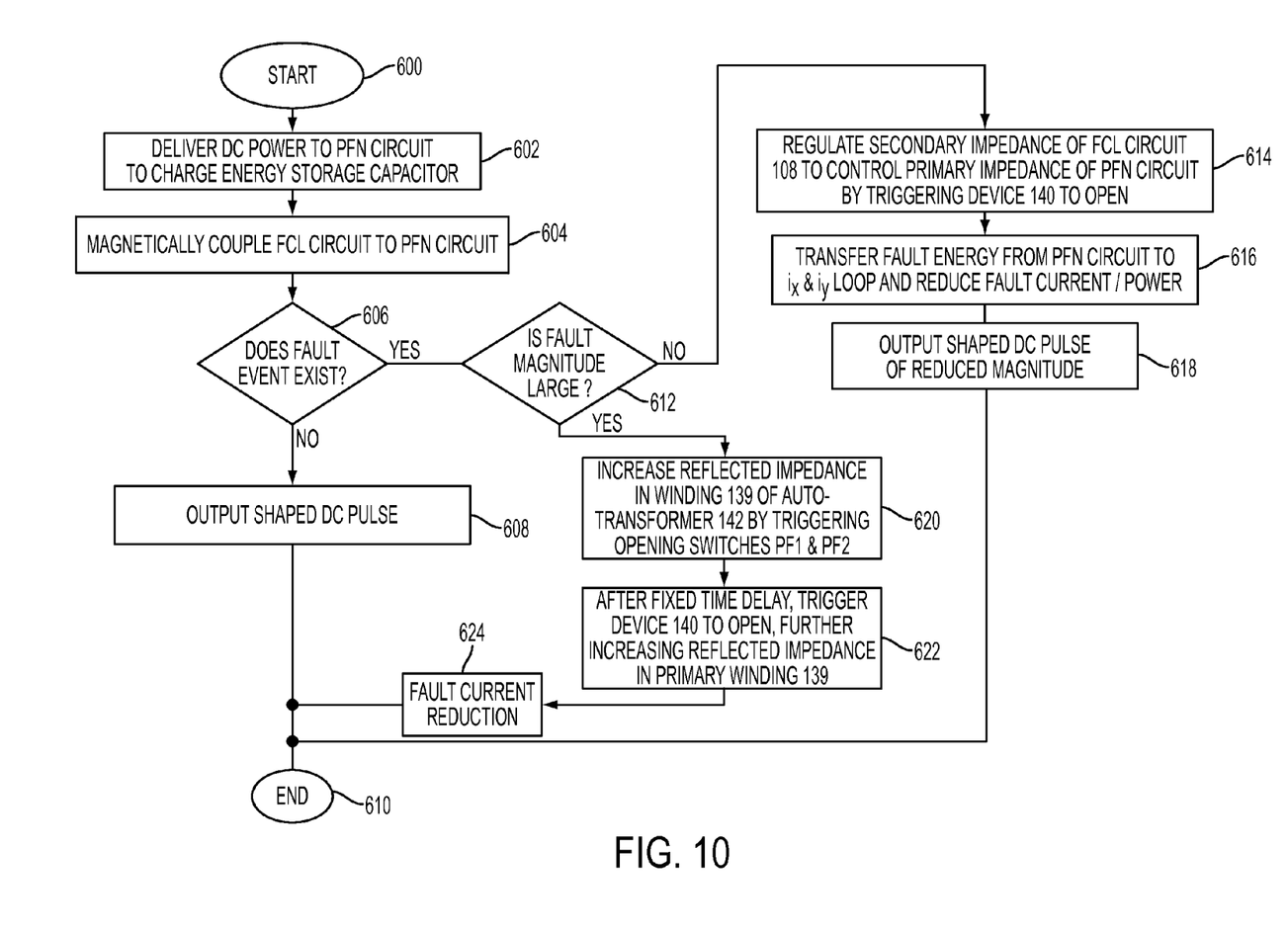
FIG. 10 is a flow diagram illustrating a method of protecting an electromagnetic DC pulse power system in response to a fault event according to another exemplary embodiment.

Turning now to FIG. 10, a method of protecting an electromagnetic DC pulse power system including an auto-transformer is illustrated according to another exemplary embodiment of the disclosure. The method begins at operation 600, and proceeds to operation 602 to deliver DC power to a pulse forming network (PFN) circuit to charge an energy storage capacitor. At operation 604, a fault current limiting (FCL) circuit is magnetically coupled to the PFN circuit. At operation 606, a determination as to whether a fault event exists. If the fault event does not exist, a shaped DC pulse is output from the electromagnetic DC pulse power system at operation 608 and the method ends at operation 610.

If the fault event is determined at operation 606, a magnitude of the fault event is determined. For example, if a fault magnitude may be detected if a source current exceeds a first current threshold. If the source current exceeds a second threshold, then the magnitude of the fault event may be determined as a large fault event. If the fault magnitude is not large, a first fault-limiting operation is initiated at operation 614. More specifically, at operation 614, a secondary impedance of the FCL circuit is regulated to control the primary impedance of a PFN circuit. At operation 616, fault energy is transferred from the PFN circuit to an $i_x$ and $i_y$ loop. Accordingly, the fault current and fault power is reduced. At operation 618, a shaped DC pulse having a reduced fault energy is output from the DC pulse power system.

If the fault magnitude determined at operation 612 is large, a second fault-limiting operation is initiated at operation 620. More specifically, a reflected impedance of the auto-transformer. For example, pyrotechnic trigger fuses may be connected to windings of the auto-transformer. If the fault magnitude is determined as large at operation 612, the pyrotechnic trigger fuses are triggered to open. At operation 622, increase reflected impedance in the primary winding of the PFN circuit after expiration of time delay. At operation 624, the fault current in the PFN is reduced in response to the increased reflected impedance in the primary winding, and the method ends at operation 610.

The corresponding structures, materials, acts, and equivalents of all means or step plus function elements in the claims below are intended to include any structure, material, or act for performing the function in combination with other claimed elements as specifically claimed. The description of various embodiments described herein has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain various principles and features of the practical application, and to enable others of ordinary skill in the art to understand the invention for various embodiments with various modifications as are suited to the particular use contemplated.

While the various embodiments have been described, it will be understood that those skilled in the art, both now and in the future, may make various modifications which fall within the scope of the following claims. These claims should be construed to maintain the proper protection for the invention first described.

What is claimed is:

1. An electromagnetic direct current (DC) pulse power system, comprising:
a plurality of pulse forming networks (PFN) modules, each PFN module comprising:
a pulse forming network (PFN) circuit configured to generate a pulsed DC output power, the PFN circuit including at least one energy storage inductor with primary winding having a primary inductance that controls a primary impedance of the PFN circuit;
a fault current limiting (FCL) circuit including a secondary winding magnetically coupled with the primary winding and to exchange or dissipate fault energy existing in the PFN circuit during a fault event, and
an energy storage capacitor and circuit interruption apparatus.

2. The electromagnetic DC pulse power system of claim 1, further comprising an internal cooling system configured to cool at least one of the primary winding and the secondary winding of the energy storage inductor or magnetic assembly, wherein the internal cooling system is configured to cool at least one conductor of the FCL circuit via a two-phase cooling system that includes a hydofluoroether (HFE) or fluoroketone dielectric fluid to remove a portion of the fault energy, and to transfer the removed fault energy to an external heat exchanger.

3. The electromagnetic DC pulse power system of claim 2, wherein the FCL circuit includes a commutating device configured to selectively control the primary inductance of the primary winding at the energy storage inductor based on the fault event.

4. The electromagnetic DC pulse power system of claim 3, wherein the commutating device is configured to operate in a first mode that electrically connects first and second connections of the secondary winding to decrease a first primary inductance, and a second mode that disconnects the first and second connections to increase a second primary inductance that is greater than the first primary inductance.

5. The electromagnetic DC pulse power system of claim 4, wherein the commutating device initiates the second mode in response to determining the fault event exists in the PFN module, through either detection of fault current, or fault power.

6. The electromagnetic DC pulse power system of claim 5, wherein at least one current sensor included with a respective first FCL circuit determines the fault event, and initiates the second mode in commutating devices contained in the secondary circuit of the energy storage inductor.

7. The electromagnetic DC pulse power system of claim 6, wherein initiating the second mode in the first and remaining commutating devices and associated secondary circuitry discharges the fault energy equally with respect to the plurality of PFN modules.

8. The electromagnetic DC pulse power system of claim 7, wherein the second mode in each commutating device in a system of multiple PFN stages is initiated simultaneously in response to determining the fault event.

9. The electromagnetic DC pulse power system of claim 8, wherein the second mode in each commutating device in a system of multiple PFN stages is initiated sequentially with respect to one another in response to determining the fault event.

10. The electromagnetic DC power system of claim 9, wherein the cooling system for the energy storage inductor includes a first internal primary cooling system configured to cool the primary winding and a secondary cooling system different from the first cooling system, the secondary cooling system configured to internally cool the secondary winding, and transfer at least a portion of the PFN fault energy to an external media, via the secondary winding as waste heat.

11. A pulse forming network (PFN) module, comprising:
a PFN circuit configured to generate a pulsed DC output power, the PFN circuit including an energy storage inductor with a primary winding having a primary inductance that controls a primary impedance of the PFN circuit;

an energy storage capacitor, a circuit interruption apparatus; and a fault current limiting (FCL) circuit including a secondary winding configured to magnetically couple with the primary winding and associated secondary circuit including passive L and R components and to exchange or dissipate fault energy existing in the PFN circuit during a fault event.

12. The PFN module of claim 11, wherein the FCL circuit includes a commutating device configured to selectively control the primary inductance of the primary winding based on at least one of the fault energy, fault current and fault power, and includes, and includes at least one external inductive and at least one resistive element to assist in dissipating fault energy away from the main PFN circuits.

13. The PFN module of claim 12, wherein the commutating device is configured to operate in a first mode that electrically connects first and second ends of the primary winding to alter a first primary inductance, and a second mode that disconnects the first and second ends to alter a second primary inductance that is greater than the first primary inductance.

14. The PFN module of claim 13, wherein the commutating device in the secondary circuit initiates the second mode in response to determining the fault event exists in the PFN module.

15. The PFN module of claim 14, wherein the commutating device is configured to initiate the second mode in response to a signal indicating a rate of rise of current (di/dt) flowing through at least one of the secondary windings and at least one of the primary windings.

16. The PFN module of claim 15, wherein the primary winding has a first number of turns to generate a first impedance, and the secondary winding has a second number of turns greater than the first numbers of turns to generate a second impedance greater than the first impedance, the secondary winding being galvanically isolated from the primary winding to further reduce a fault current in the PFN.

17. The PFN module of claim 12, further comprising an auto-transformer configured to provide a two-stage fault-limiting system, the auto-transformer including at least one auto-transformer winding having an impedance that is increased based on operation of an isolated switching device.

18. A method of protecting an electromagnetic DC pulse power system from fault energy delivered to a pulse forming network (PFN) circuit during a fault event, the method comprising:

electromagnetically coupling a fault current limiting (FCL) circuit to the PFN circuit;

detecting the fault event in the PFN circuit;

adjusting the secondary impedance of the FCL circuit to control a primary impedance of the PFN circuit;

inserting external energy dissipating elements into the FCL secondary circuit with a fast response time by use of commutating devices; and transferring the fault energy from the PFN circuit to the FCL circuit in response to controlling the impedance of the PFN circuit.

19. The method of claim 18, wherein the electromagnetically coupling further comprises:

flowing a primary current through a primary winding of the PFN circuit, the primary winding having a first inductance to increase overall circuit inductance and reflected resistance in the PFN circuit; and energizing a secondary winding of the FCL circuit to the electromagnetic field to induce a secondary current that flows through the FCL circuit, the secondary winding having a second inductance that is greater than the first inductance to cause resistance in the secondary circuit to be reflected into the primary circuit.

20. The method of claim 19, wherein the adjusting the secondary impedance further comprises controlling the first and second connection of the secondary winding based on a magnitude and duration of the fault event, including short circuiting the first and second ends of the secondary winding by use of at least one of an active switching, commutating device, and a non-linear resistance clamping device.

* * * * *